(12) United States Patent
Ahn

(10) Patent No.: US 8,521,807 B2
(45) Date of Patent: Aug. 27, 2013

(54) METHOD AND SYSTEM FOR CONTROLLING MOVEMENT OF USER SETTING INFORMATION REGISTERED IN SERVER

(75) Inventor: Jae-min Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 12/431,964

(22) Filed: Apr. 29, 2009

(65) Prior Publication Data

US 2009/0300431 A1    Dec. 3, 2009

(30) Foreign Application Priority Data

Jul. 1, 2008    (KR) .................. 10-2008-0063433

(51) Int. Cl.
*G06F 15/16*    (2006.01)

(52) U.S. Cl.
USPC ........... 709/203; 709/204; 709/205; 709/206; 709/238; 709/227; 370/270; 370/261; 370/254

(58) Field of Classification Search
USPC .............. 709/203–206, 238, 227; 370/270, 370/261, 254
See application file for complete search history.

(56) References Cited

U.S. PATENT DOCUMENTS

| | | | |
|---|---|---|---|
| 7,774,711 B2* | 8/2010 | Valeski | 715/752 |
| 2002/0129000 A1* | 9/2002 | Pillai et al. | 707/1 |
| 2004/0250205 A1* | 12/2004 | Conning | 715/517 |
| 2005/0235038 A1* | 10/2005 | Donatella et al. | 709/206 |
| 2007/0162420 A1* | 7/2007 | Ou et al. | 707/1 |
| 2007/0206920 A1* | 9/2007 | Hirose et al. | 386/95 |
| 2008/0008106 A1* | 1/2008 | Boberg et al. | 370/270 |
| 2009/0043674 A1* | 2/2009 | Minsky et al. | 705/27 |
| 2009/0144068 A1* | 6/2009 | Altberg et al. | 705/1 |

* cited by examiner

*Primary Examiner* — Wing F Chan
*Assistant Examiner* — Benjamin M Thieu
(74) *Attorney, Agent, or Firm* — NSIP Law

(57) ABSTRACT

A method and system to utilize an Extensible Markup Language (XML) Configuration Access Protocol (XCAP) in which a MOVE command is newly defined, and a user setting information movement request is processed in one operation, are disclosed. A method of controlling movement of particular user setting information registered in a server includes, at a client, transmitting a movement request message including a movement command to set user information, and at the server, processing movement of the particular user setting information as commanded by the movement request message and transmitting a response message.

16 Claims, 6 Drawing Sheets

METHOD AND SYSTEM FOR CONTROLLING MOVEMENT OF USER SETTING INFORMATION REGISTERED IN SERVER

CROSS-REFERENCE TO RELATED APPLICATION(S)

This application claims the benefit under 35 U.S.C. §119(a) of a Korean Patent Application No. 10-2008-63433, filed on Jul. 1, 2008, the disclosure of which is incorporated herein in its entirety by reference.

BACKGROUND

1. Field

The following description relates to an Extensible Markup Language (XML) Configuration Access Protocol (CAP), and more particularly, to employing XCAP in which XCAP is extended to manage user setting information registered in a server, and a method thereof.

2. Description of the Related Art

With the rapid development of signaling protocols, a Session Initiation Protocol (SIP) standard has been established by the Internet Engineering Task Force (IETF). SIP standard technology has been employed as core technology for multimedia application services in next-generation network environments such as 3rd Generation Partnership Project (3GPP), 3GPP2, and Next Generation Network (NGN). It appears that the future of Internet Protocol (IP)-based multimedia application services is centered on standardizing SIP standard technology.

Various messaging services such as Short Message Service (SMS), Multimedia Messaging Service (MMS) and electronic mail are widely used by Internet users. Instant Messaging (IM) is one of the most popular messaging services and is capable of transmitting multimedia data as well as text (similar to MMS), and exchanging messages in real time, unlike electronic mail.

Presence Service (PS) is a network service which accepts, stores, and receives information corresponding to a presence of particular users at remote sites on the Internet. PS also may provide various information including whether users are presently able to participate in real-time communication, which services are available, what the users are presently doing, and how the users feel at any given moment. PS service enables a user of a real-time service, such as an IM service, to determine whether to send a message by providing the user with information on whether another user at a remote site on the Internet is presently capable of receiving the message. Thus, a presence-based IM service is a very useful means of exchanging various multimedia data between on-line users in real time.

Currently, the presence-based IM service is used by most Internet users and provided by various service providers in the form of a messenger service that is integrated with various supplementary services. However, the presence-based IM service does not support communication between users of different messenger services. In order to support interoperation of different messenger services, an international Instant Messaging and Presence Protocol (IMPP) standard is needed. Research into establishing an IMPP standard is being actively conducted by the IETF. In particular, research into utilizing SIP as IMPP is being conducted by the SIMPLE (SIP instant messaging and presence leveraging extension) working group.

IMPP service is being standardized by the IETF IMPP working group and the SIMPLE working group. The IMPP working group was organized to define a protocol and a data format to provide the IMPP service, which entails defining an IMPP service model, requirements of an IMPP service model, data formats of messages exchanged between systems, and so on.

The SIMPLE working group was organized to utilize SIP as IMPP, and is the most active IMPP-related working group. SIP is being considered by communication service providers to provide an IP phone service. Since SIP is utilized by NGN, Open Mobile Alliance (OMA), and 3GPP standards, integrating SIP with IP phone service is feasible, and a separate protocol for IMPP is not needed.

In addition, the SIMPLE working group is researching an extended data format with regard to presence information, partial presence information notification, presence information filtering, message session setting for IM service, and XCAP-related techniques to manage user setting information of particular services.

In particular, XCAP was devised to enable clients to utilize data stored in a server in XML form. User setting information regarding particular application services is stored in an XCAP server in XML and managed directly by an XCAP client using Hyper Text Transfer Protocol (HTTP) to access the XCAP server. In XCAP, three types of HTTP methods, i.e., GET, PUT and DELETE, are used, and HTTP Uniform Resource Identifier (URI) mapping is necessary to handle particular user setting information within an XML document.

Where the XCAP client requests the XCAP server for a resource, the location of the resource is commonly represented using a Universal Resource Locator (URL). However, dynamically generated information, such as search results of a search engine, cannot be expressed using URLs. Therefore, a dynamic document is requested by using an URI which includes both a URL and a user query. Generally, a URL only indicates the location of a resource, but a URI includes a factor to be transmitted to the location of the resource. A URL can be regarded as a special form of URI.

With the rapid development of signaling and networking technologies, it is expected that a presence service to express a present status of users will be developed to support communication between users of different messenger services. It is also expected that interest in XCAP standard technology, which was developed to provide the IMPP service and provides a basic mechanism which is applicable to various Internet applications as well as IMPP service, will increase. Since most Internet applications employ XML, it is expected that practical use of XCAP standard technology will greatly increase.

SUMMARY

In one general aspect, there is provided a method of controlling movement of user setting information registered in a server, including at a client, transmitting a movement request message which includes a movement command of particular user setting information to the server, and at the server, processing movement of the particular user setting information as commanded by the movement request message and transmitting a response message.

The movement request message may include a method of commanding movement of the user setting information, and a position and an attribute of the user setting information.

The method may be a POST method generated based on an XML Configuration Access Protocol (XCAP).

The processing of the movement of the user setting information may include checking whether the user setting information indicated by the movement request message exists, moving the user setting information to a designated position where the user setting information exists, and generating an error response message where the user setting information does not exist.

The processing of movement of the indicated user setting information may include checking a body of the movement request message where the user setting information exists, updating new user setting information at a designated position where the new user setting information exists in the body, and moving existing user setting information to a designated position where new user setting information does not exist in the body.

The updating of the new user setting information may be performed using at least one of a method of adding the new user setting information at a designated position after deleting existing user setting information, a method of updating existing user setting information with the new user setting information and moving the updated user setting information to a corresponding position, and a method of adding the new user setting information at a designated position while deleting the existing user setting information.

According to another general aspect, there is provided a method of controlling movement of user setting information registered in a server, including transmitting a movement request message corresponding to particular user setting information to the server in response to a user request, receiving a response message to the movement request message from the server and analyzing the response message, and re-transmitting the movement request message commanding movement of the particular user setting information where the response message includes failure information.

The movement request message may include a method of commanding movement of the user setting information, and a position and an attribute of the user setting information.

The method may be a POST method generated based on an XML Configuration Access Protocol (XCAP).

According to still another general aspect, there is provided a method of controlling movement of user setting information registered in a server, including receiving a movement request message from a client, searching to find user setting information indicated by the movement request message, and processing movement of the indicated user setting information at a designated position where the user setting information exists.

The processing of movement of the indicated user setting information may include checking whether user setting information indicated by a movement request message exists, updating new user setting information at a designated position where the new user setting information exists in the body, and moving existing user setting information to a designated position where new user setting information does not exist in the body.

The updating of the new user setting information may be performed using at least one of a method of adding the new user setting information at a designated position after deleting existing user setting information, a method of updating existing user setting information with the new user setting information and moving the updated user setting information to a corresponding position, and a method of adding the new user setting information at a designated position while deleting the existing user setting information. According to yet another general aspect, there is provided a system to control movement of user setting information, including a client to generate and transmit a movement request message in response to a user request, the message including a method of commanding to move particular user setting information, and a position and an attribute of user setting information corresponding to the movement command, and a server to process movement of the particular user setting information in response to the movement request message of the client, and generate and transmit a response message including movement processing result information.

The method may be a POST method generated based on an XML Configuration Access Protocol (XCAP).

The client may include a message generator to generate a control message to control user setting information in response to a user's control command and the response message from the server, and generate the movement request message corresponding to movement of the user setting information as the control message using a POST method.

The server may check whether user setting information indicated by the movement request message exists and move the user setting information to a designated position where the user setting information exists.

The server may check a body of the movement request message where the user setting information exists, and update new user setting information at a designated position where the new user setting information exists in the body.

The server may perform the update using at least one of a method of adding the new user setting information at a designated position after deleting existing user setting information, a method of updating existing user setting information with the new user setting information and moving the updated user setting information to a corresponding position, and a method of adding the new user setting information at a designated position while deleting the existing user setting information.

The server may include a resource search module to search to find user setting information indicated by the movement request message, a body search module to search to find new user setting information in a body of the movement request message, and a resource processor to process control of user setting information according to a command commanded by a request message of the client, and process movement of user setting information at a designated position commanded by the movement request message as the request message, according to a set processing method.

Other features and aspects will be apparent from the following detailed description, the drawings, and the claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Figure 1:
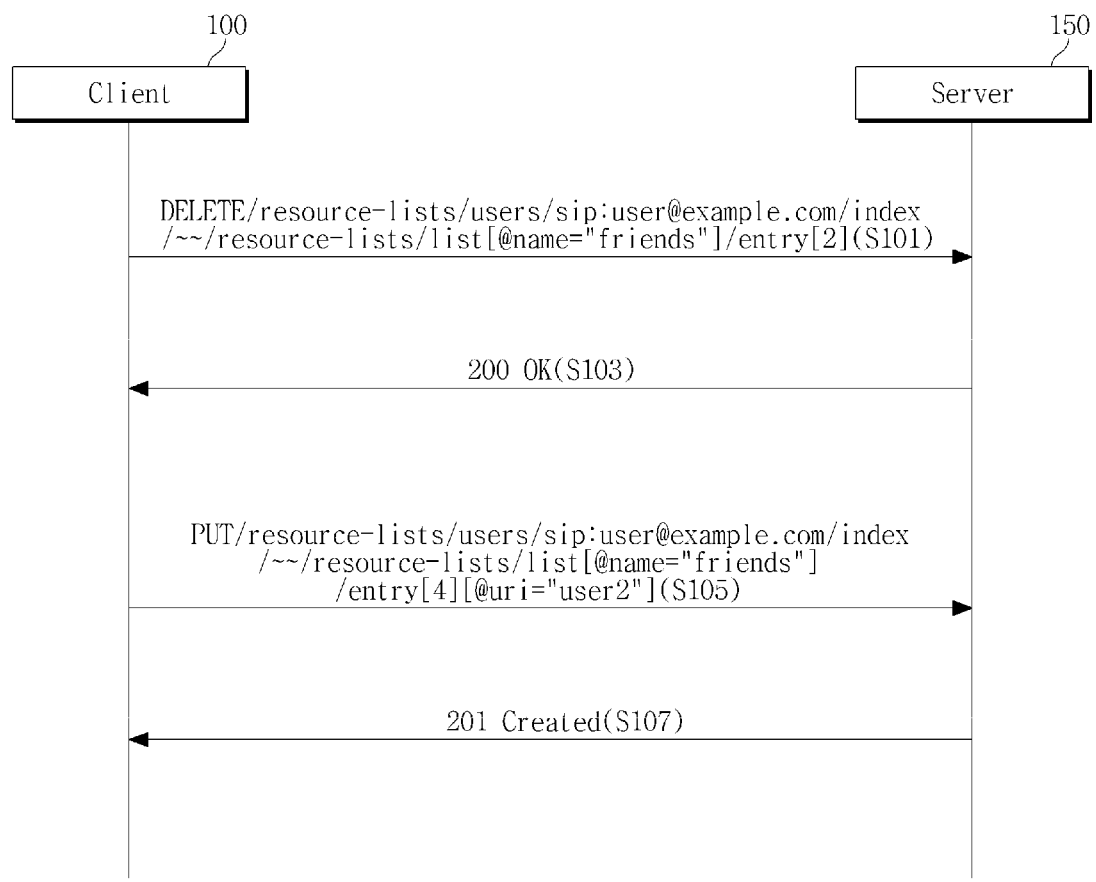
FIG. 1 is a view illustrating an example in which a particular item is moved in a resource list utilizing a conventional XCAP operation.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The following description relates to XCAP to manage user setting information of a client corresponding to a particular application service between a client and a server. It is assumed that a client and a server support XCAP technology.

In XCAP technology, user setting information regarding the particular application service is registered in the server, and the client directly manages information registered in the server. The user setting information may be presence information corresponding to a presence service or various other kinds of information, and a separate event package may be defined in a standard corresponding to each piece of particular information.

The following is an exemplary embodiment where user setting information is a list (for example, a friend list) of a particular group on the Internet. A user may register a user setting information in the server through the client and reregister the user setting information whenever it changes. The user may access a corresponding server to acquire the user setting information.

As described above, in services such as the presence service, information may be managed per user corresponding to a group list. The information may be stored in the client, but where the information is stored in the server, data stability can be guaranteed and existing information can be used "as is" without any inconvenience, even where the client is replaced.

User setting information corresponding to each application registered in the server is written in an XML document, and a protocol used to allow the client to access the XCAP server is based on HTTP, which is widely used in an Internet environment. In XCAP technology, three types of HTTP methods are used: GET, PUT and DELETE.

XCAP is based on HTTP and includes a request of the client and a response of the server. Each set of user setting information is stored in the form of at least one XML, and the client can fetch, add or delete user setting information using the GET, PUT and DELETE methods of HTTP.

Meanwhile, the client can request processing of all or some user setting information stored in an XML form. For example, a whole group list to which a client user belongs can be changed through one request, the deletion of one item in a group list can be requested, or an addition of a new item to an existing group list may be requested.

In services which use XCAP, a position of each item of user setting information may have an important meaning. Supposing a group list as illustrated in Table 1 below is stored in the server, the group list needs to be provided to the user with the items arranged in the order in which the group list is stored. Also, the user has to be able to change the order of items in the group list at any time if necessary.

TABLE 1

| | |
|---|---|
| friends | user1 |
| | user2 |
| | user3 |
| | user4 |
| family | family1 |
| | family2 |
| | family3 |

For example, in Table 1, an item "user2" is stored as the second item of a group "friends." Where the user desires to place the item "user2" at the last position, in existing XCAP technology, the item "user2" registered in the server may be deleted and then added again at a fourth position through a communication between the client and the server. Detailed operation of the server depends on an XML schema and application usage, but the operation most widely performed for a resource list is illustrated in FIG. 1 described below.

A resource list function in the presence service provides status information of members of a particular group in which the user has an interest. The server receives request information based on such a resource list, collects status information of members of a particular group requested by the user, and transmits the collected information to the user. For example, where the user requests status information of the group "friends," the corresponding server collects status information of members of the group "friends" and transmits the collected information to the user.

FIG. 1 illustrates an example in which a particular item is moved in a resource list using a conventional XCAP operation. In particular, FIG. 1 illustrates an operation for moving the item "user2" from second position to fourth position in the group "friends" of Table 1.

Referring to FIG. 1, the item "user2" is stored as the second item of the group "friends" as shown in Table 1. Where the user requests movement of the item "user2" to the last position of the group list "friends", a client 100 generates a deletion request message to request deletion of the item "user2" in the group list "friends" in response to the user request and transmits the deletion request message to a server 150 (operation S101). The deletion request message may be generated and transmitted in a message format illustrated in FIG. 1 using the DELETE method among HTTP methods (GET, PUT and DELETE) as described above. The DELETE method includes deleting a data object identified by a request URI.

Next, the server 150 deletes the item "user2" from the group list "friends" in response to the deletion request message and transmits a response message to the client 100 (operation S103). A 200 OK message may be used as the response message.

Next, the client 100 which has received the response message generates an addition request message to request addition of a new item "user2" to the fourth position of the group list "friends," and transmits the addition request message to the server 150, in response to the response message (operation S105). The addition request message can be generated and transmitted in a message format illustrated in FIG. 1, using the PUT method among HTTP methods (GET, PUT and DELETE) as described above. The PUT method includes updating an object identified by a request URI in XML data provided from the request body.

Next, the server 150 adds the new item "user2" at the requested position of the group list "friends" in response to the addition request message and transmits a response message to the client 100. A 201 Created message may be used as the response message (operation S107).

As described with reference to FIG. 1, in order to move particular information among user setting information through the existing XCAP technique, two (transaction) processes are performed. The first process includes an operation of deleting the second item from the group list "friends", and the second process includes an operation of adding the new item "user2" at the fourth position of the group list "friends."

That is, in the conventional XCAP technique, a function to move user setting information as illustrated in Table 2 is not provided. Therefore, the complicated conventional procedure described above is required to move user setting information.

Also, the conventional XCAP technique has a problem in that a lot of network traffic is generated. In order to move particular user setting information, two requests and two responses may be exchanged between the client 100 and the server 150, and thus data may be exchanged twice as many times as where processing is performed in a single operation.

Also, in the conventional XCAP technique described above, a data stability problem may occur. That is, the user desires to move the new item "user2" to the fourth position, but since two processes are individually performed, the new item "user2" is in a deleted state during an interval between the first operation and the second operation. Generally, in conventional XCAP technology, it is premised that data is stored in the server and simultaneously used by various clients. Therefore, if another client acquires the group list while the new item "user2" is deleted, data that is different from original user setting information may be acquired. If the second operation is not performed normally due to a network problem between the client 100 and the server 150 or a problem of the server 150 itself, the user setting information may be stored incorrectly.

If a method of modifying all user setting formation is used in order to avoid the above-described problem, processing requires only one transaction, but since all user setting information has to be re-transmitted, this method is very inefficient since it results in unnecessary network traffic.

For the foregoing reasons, an exemplary embodiment includes a method employing XCAP to more efficiently manage user setting information registered in an XCAP server. In the exemplary embodiment, a movement command not supported in existing XCAP technology is newly defined, and a user setting information movement request is processed in one operation using the movement command.

According to the exemplary embodiment, the movement command can be defined as a POST method. The POST method includes moving XML data included in the request body to a child object of an element identified by a request URI. That is, the POST method represents a command system corresponding to "MOVE." However, a method of a movement command is not limited to the POST method, and a processing method according to the PUT method can be changed or a method of a different movement command may be newly defined. However, to allow backward compatibility with the existing system, the POST method which is currently used in the existing HTTP method may be used.

The foregoing exemplary embodiments can be applied by modifying only software without changing the existing configuration of the server and the client. Table 2 illustrates HTTP methods used in XCAP and operations according to HTTP methods.

TABLE 2

| | Existing XCAP methods | XCAP method of the present invention |
|---|---|---|
| HTTP Request | Basic XCAP operation | (Same as the left) |
| GET | This method is used to get the whole document or some items. | (Same as the left) |
| PUT | This method is used to add (replace if already exists) the whole document or some items. | (Same as the left) |
| DELETE | This method is used to delete the whole document or some items. | (Same as the left) |
| POST | Not defined | This method is used to move the location of some items of a document. |

An example of moving a particular item in the resource list using the POST method will be described below.

Figure 2:
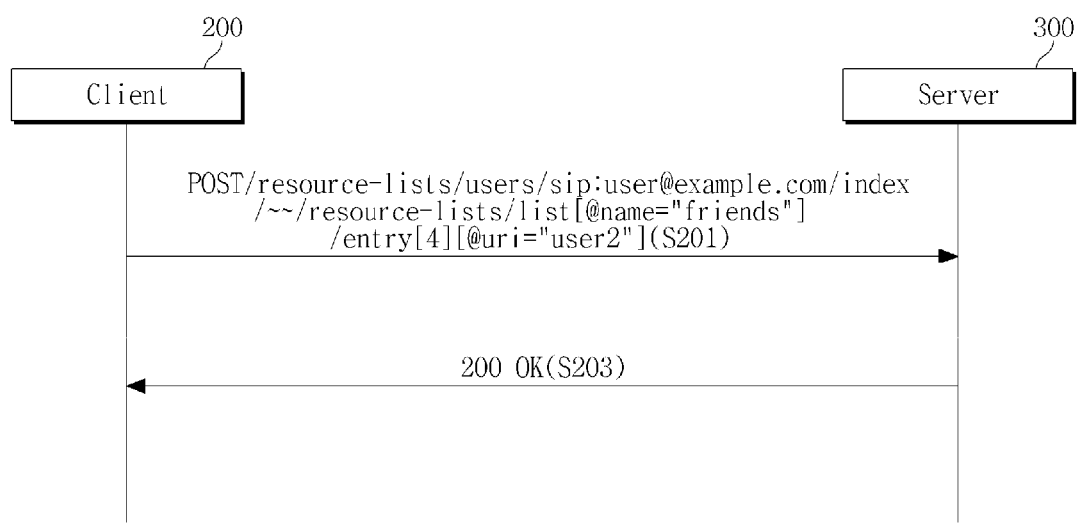
FIG. 2 is a view illustrating an example in which particular user setting information is moved in a resource list using an exemplary XCAP operation.

FIG. 2 illustrates an example of moving particular user setting information in the resource list using an exemplary XCAP operation. In particular, FIG. 2 is a view illustrating an operation of moving the new item "user2" located at the second position of the group "friends" of Table 1 to the fourth position.

Referring to FIG. 2, in response to a position movement request from a user corresponding to the new item "user2" in the group list "friends," a client 200 generates a movement request message to request movement of the new item "user2" at a designated position and transmits the movement request message to a server 300 (operation S201). The movement request message may be generated and transmitted in a data format illustrated in FIG. 2 using the POST method among HTTP methods described above.

In order to request position movement of user setting information, the client 200 generates a URI suitable for a movement request as illustrated in FIG. 2. The URI has the same structure as in the conventional XCAP technique, and can may a position and an attribute of a corresponding item. The position corresponds to "[@name="friends"]/entry[4]" in the URI structure of FIG. 2 and designates a position at which a requested item will be positioned. The attribute corresponds to "[@uri="user2"]" in the URI structure of FIG. 2 and designates a corresponding item which is requested to be moved.

However, the URI according to the exemplary embodiments is not limited to the above-described structure. The URI according to the exemplary embodiments may have various structures defined in advance between the client 200 and the server 200, as illustrated in Table 3. Table 3 illustrates URI structures to move an item in the group list with reference to Table 1.

TABLE 3

| URI Structure | Description |
|---|---|
| list[@name="friends"]/ entry[4][@uri="user2" | The item "user2" in the group list "friends" is moved to the fourth position of the group list. |
| list[@name="friends"]/ [4][2] | The second item in the group list "friends" is moved to the fourth position of the group list. |
| list[3]/[2][4] | If the group "friends" is a third group of the whole list, the second item of the third group is moved to the fourth position. |
| list[@name="friends"]/ [2][4] | The second item in the group list "friends" is moved to the fourth position. |

As illustrated in Table 3, URI structures of various forms which are defined in advance between the client 200 and the server 200 may be used. Furthermore, an order of position and attribute may be changed by definition between the client 200 and the server 300.

Where desiring to move only a position without modifying existing user setting information, the client 200 may transmit a message having no body, and where user setting information needs to be modified, the client 200 may include modified user setting information in the body of the message and transmit the message. During simple position movement, since the body is not transmitted, the above method is very efficient in reducing network traffic, compared to the PUT method of the existing XCAP technique which requires the body.

Next, the server 300 moves the corresponding new item "user2," at a designated position according to a procedure described below, and transmits a response message to the client 200. Here, a 200 OK message may be used as the response message.

The server 300 which has received the POST method having the URI from the client 200 searches to find user setting information corresponding to the attribute of the received URI structure in the list of the corresponding group. That is, the server 300 searches to find the new item "user2" in the group list "friends." Where the user setting information exists, the server 300 moves the user setting information at a designated position corresponding to the attribute. Thereafter, the server 300 transmits a response message reporting that the requested position movement has been performed normally to the client 200.

Where the request message of the client 200 has the body, the server 300 can add a new item "user2" included in the body to a new position, that is, the fourth position.

However, where the user setting information does not exist, the server 300 transmits an error response message reporting that the user setting information was not found to the client 200 and concludes processing of the movement request. Here, a 404 Not Found message may be used as the error response message. A procedure where an error occurs, such as where the user setting information is not found, will be described below.

Figure 3:
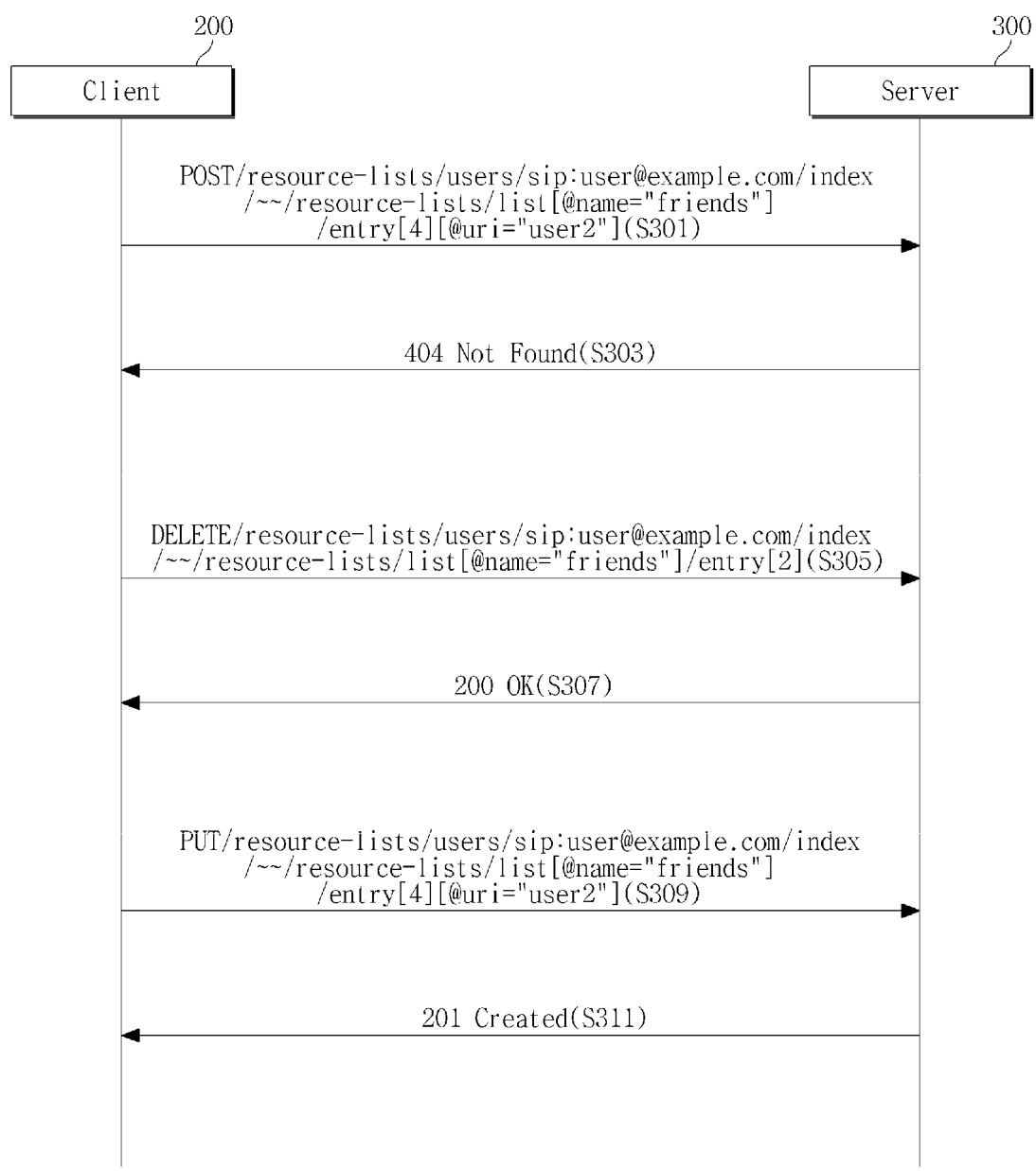
FIG. 3 is a view illustrating another example in which particular user setting information is moved in a resource list using an exemplary XCAP operation.

FIG. 3 illustrates a procedure of moving particular user setting information in the resource list using the exemplary XCAP operation. In particular, FIG. 3 is a view illustrating an operation of moving the new item "user2" located at the second position of the group "friends" of Table 1 to the fourth position.

As illustrated in FIG. 3, an operation (operation S301) of transmitting a movement request message from the client 200 in response to a position movement request corresponding to the new item "user2" from the user corresponds to operation S201 of FIG. 2. Therefore, a detailed description of operation S301 is omitted.

The server 300 which has received the movement request message from the client 200 searches to find user setting information requested to be moved by the URI of the received movement request message. For example, the server 300 searches for the new item "user2" in the group list "friends."

If the requested user setting information does not exist, the server 300 transmits a response message reporting that the requested user setting information was not found to the client 200 and concludes processing of the movement request (operation S303).

Next, where the response message is received from the server 300, the client 200 recognizes that the user setting information movement request fails and may perform a predetermined operation which is set in advance.

For example, a procedure of moving user setting information may be performed again corresponding to the existing procedure as in operations S305 through S311 of FIG. 3. Operations S305 through S311 correspond to operations S101 through S107 of FIG. 1, and thus a detailed description is omitted.

As another example, where receiving the response message, the client 200 may re-transmit the movement request message a previously set number of times.

As another example, where receiving the response message, the client 200 recognizes that the user setting information does not exist in the server 300 and may include and transmit corresponding user setting information requested to be moved in the body of an addition request message.

In addition to the above-described operations, where an initial movement request operation fails, the client 200 may perform operations corresponding to previously set methods.

Figure 4:
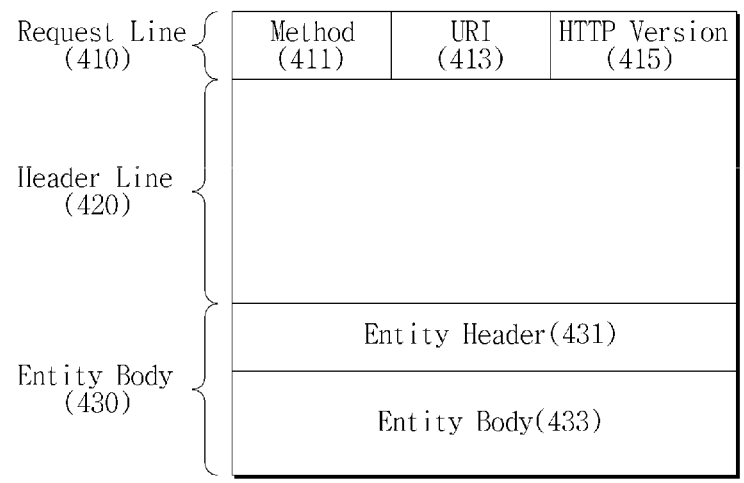
FIG. 4 is a view illustrating an exemplary structure of a movement request message t.

FIG. 4 is a view illustrating an exemplary structure of a movement request message.

Referring to FIG. 4, the movement request message corresponding to a user setting information movement command according to an exemplary embodiment includes a request line 410, a header line 420, and an entity body 430. The message structure is one embodiment, and is not intended to limit the scope of the exemplary embodiments disclosed herein. That is, the message structure may vary.

The request line 410 may include a method field 411 to represent a method to be applied to control a resource, that is, user setting information, a URI field 413 to identify user setting information, and a protocol version field 415 to represent a used protocol version. Here, the POST method is used as the method.

The header line 420 is a header field to transmit information requested by the client 200 and additional information about the client 200 to the server 300.

The entity body 430 may include an entity header field 431 and an entity body field 433. The entity header field 431 can be used to define meta information corresponding to a resource identified by a request where meta information of an entity body or an entity body does not exist. The entity body field 433 may include changed user setting information where user setting information desired to be moved has been updated.

In order to move particular user setting information registered in the server 300, the client 200 provides the server 300 with a method of a movement command and an URI of corresponding user setting information through the movement request message. In the exemplary embodiment, the POST method can be used by the movement command, and the URI can be provided in various forms as described above with reference to Table 3.

The server 300 moves corresponding user setting information, corresponding to the movement command, for example, the POST method. That is, in the exemplary embodiment, the movement command includes control information to control movement of user setting information. The URI includes information such as a position of user setting information desired to be moved and a position to which the user setting information is to be moved. The movement command can be generated using a HTTP PUT command or a HTTP POST command, or using a header or an entity body of the movement request message.

According to the exemplary embodiment, an information communication device, a multimedia device or any of various application devices which can support services using the Internet, such as a Personal Digital Assistant (PDA), a Portable Multimedia Player (PMP), an MP3 player, a digital broadcasting player, a mobile communication terminal, a laptop computer, and a personal computer, can be used as the client 200. Structures of the client 200 and the server 300 according to an exemplary embodiment will be described below with reference to FIG. 5.

Figure 5:
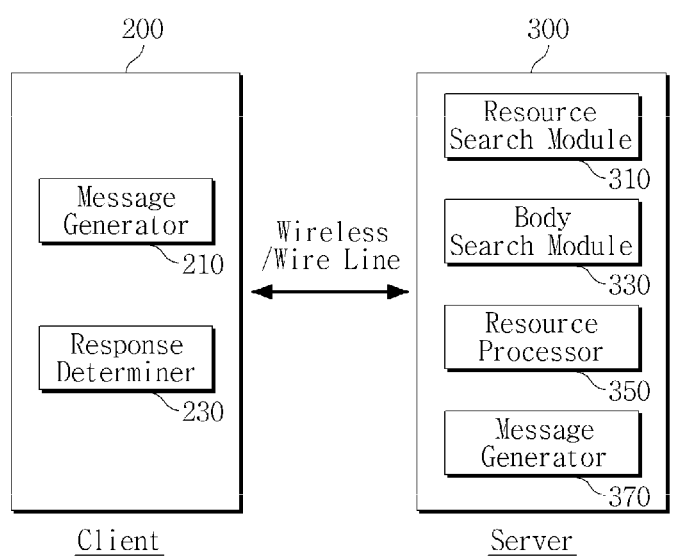
FIG. 5 is a block diagram illustrating exemplary structures of a client and a service.

FIG. 5 is a block diagram illustrating exemplary structures of a client 200 and a server 300.

Referring to FIG. 5, the client 200 according to an exemplary embodiment includes a message generator 210 and a response determiner 230, and the server 300 according to an exemplary embodiment includes a resource search module 310, a body search module 330, a resource processor 350, and a message generator 370. The client 200 and the server 300 may be connected to each other in either or both of wireless and wired methods.

Hereinafter, the components of the client 200 and operation of each component will be described.

The message generator 210 generates a control message to control user setting information in response to a control command of a user. The control message includes a movement request message, a deletion request message and an addition request message. In particular, the message generator 210 may generate the movement request message using the POST method as a user setting information movement command.

Also, according to a response message reception determination result of the response determiner 230, the message generator 210 may generate the deletion request message using the DELETE method as a user setting information deletion command, and may generate the addition request message using the PUT method as a user setting information addition command.

The response determiner 230 analyzes a particular response message received from the server 300 in response to a particular request message transmitted from the client 200. In particular, the response determiner 230 may determine whether the response message of the server 300 includes success information or failure information as a response to the transmitted request message.

Next, the components of the server 300 and operation of each component will be described.

The resource search module 310 searches to find a resource, that is, user setting information, designated by a particular request message transmitted from the client 200. In particular, the resource search module 310 searches to find user setting information requested to be moved, in response to the movement request message of the client 200.

The body search module 330 searches to find user setting information included in the movement request message from the client. In particular, the body search module 330 checks whether new user setting information corresponding to user setting information requested to be moved is included in the body of the movement request message.

The resource processor 350 controls (deletes, moves or adds) user setting information according to a command included in the request message from the client 200. In particular, the resource processor 350 moves user setting information designated by the movement request message at a designated position according to a previously set processing method.

The message generator 370 generates a response message including processing result information requested by the client 200. In particular, the message generator 370 generates an error response message where user setting information requested to be moved is not found. A 404 Not Found message may be used as the error response message. The message generator 370 generates a success response message where processing of user setting information requested to be moved is completed normally. A 200 OK message may be used as the success response message. The message generator 370 may generate various response messages according to a processing result of the server 300 in addition to the messages described above.

FIG. 5 schematically illustrates example configurations of the client 200 and the server 300. However, the client 200 and the server 300 are not limited to the configurations illustrated in FIG. 5. In particular, the client 200 can further include components which are not mentioned above, such as an input module, a display module, a camera module, a digital broadcasting receiving module, a Near Field Communication (NFC) module, an Internet communication module, and a music reproducing module. Also, where the client 200 supports a mobile communication service, it the client 200 may further include a communication module. A portable terminal may be used as the client 200, and components of the portable terminal may be partially removed or replaced with different functional blocks. The server 300 may have various configurations.

Next, operations of the client 200 and the server 300 to perform user setting information movement processing will be described in detail, but the client 200 and the server 300 are not limited to the embodiment described below, which can be modified in various ways.

Figure 6:
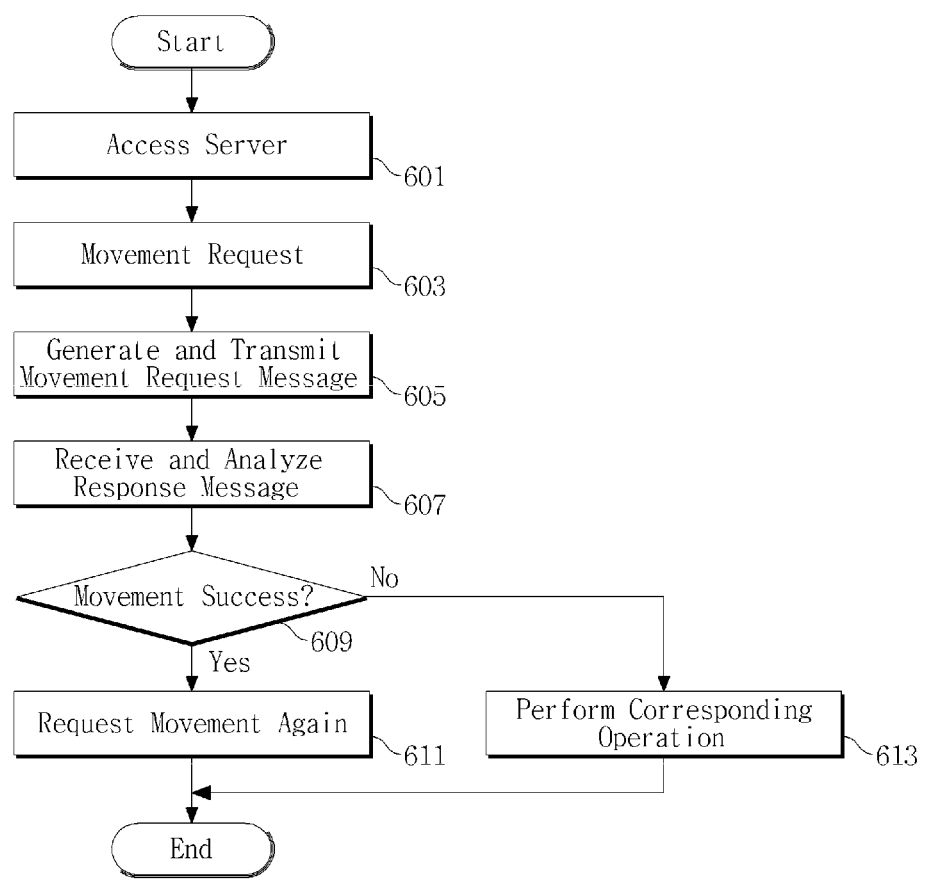
FIG. 6 is a flowchart illustrating an exemplary client-side procedure of controlling movement of user setting information.

FIG. 6 is a flowchart illustrating an exemplary client-side procedure of controlling movement of user setting information.

Referring to FIG. 6, the client 200 accesses the server 300 in response to a user's request (operation 601). At this time, the client 200 may display user setting information (i.e., a group list) requested by the user where having access to the server 300.

Next, where movement of particular user setting information is requested by the user (operation 603), the client 200 generates the movement request message in response to the user request and transmits the movement request message to the server 300 (operation 605). At this time, the movement request message can be generated using the POST method as a movement command corresponding to user setting information.

Next, the client 200 receives the response message from the server 300 in response to the movement request message and analyzes the response message (operation 607). That is, the client 200 analyzes whether the response message from the server 300 includes success information or failure information with respect to the movement request (operation 609). For example, where a 200 OK message is received as the response message, it is determined that movement of user setting information has succeeded, but where a 404 Not Found message is received as the response message, it is determined that movement of user setting information has failed.

Where the response message indicates a success (YES of operation 609), the client 200 may perform a next operation requested by the user (operation 613). For example, movement of different user setting information, modification of user setting information, or an operation of Internet service may be performed.

Where the response message indicates a failure (NO of operation 609), the client 200 may request movement of the user setting information to the server 300 again according to a previously set method (operation 611).

The operation of requesting movement of user setting information again may even be performed by signaling according to addition and deletion of corresponding user setting information as described above with reference to FIG. 3, or by re-transmitting the movement request message. In addition, the failure reason is analyzed, and if the movement request message includes an error, it can be corrected and re-transmitted.

Figure 7:
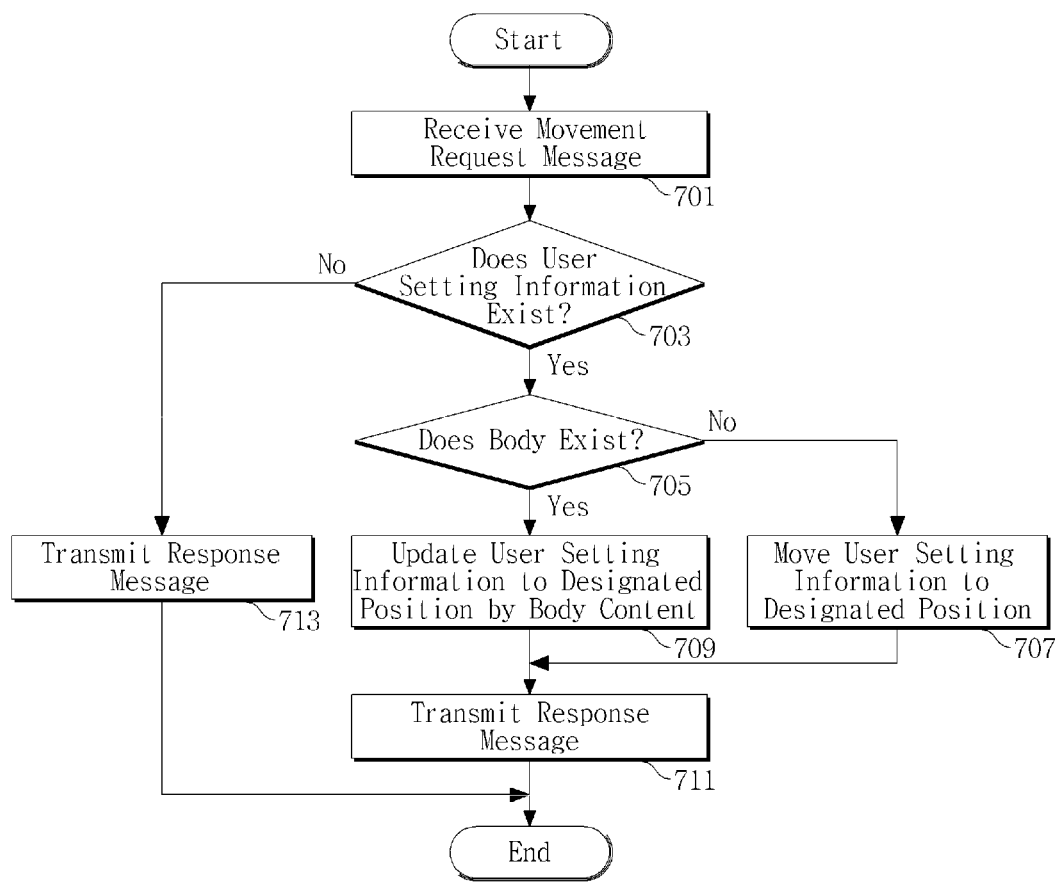
FIG. 7 is a flowchart illustrating an exemplary server-side procedure of controlling movement of user setting information.

FIG. 7 is a flowchart illustrating an exemplary server-side procedure of controlling movement of user setting information.

Referring to FIG. 7, the server 300 receives the movement request message from the client 200 (operation 701) and searches to find user setting information requested to be moved through the movement request message (operation 703). At this time, the server 300 may confirm a command method of the received message to recognize the received message as the movement request message. The server 300 may confirm a header of the received message and recognize the received message as the movement request message where a command is a movement command. The server 300 may confirm a position and an attribute of user setting information requested to be moved by analyzing a URI of the movement request message.

Where operation 703 determines that the user setting information exists, the server 300 checks whether the user setting information is included in the entity body of the movement request message (operation 705).

Where operation 703 determines that the user setting information does not exist in the entity body, the server 300 moves the found user setting information to a designated position (operation 707). Where movement of user setting information requested to be moved is successfully completed, the server 300 transmits a response message to the client 200 (operation 711). That is, where movement of user setting information succeeds, the server 300 generates a success response message, such as a 200 OK message, and transmits the success response message to the client 200.

Where operation 705 determines that new user setting information exists in the entity body, the server 300 updates the existing user setting information with the new user setting information included in the entity (operation 709).

The update may depend on how the server 300 is embodied. For example, the server 300 may process the movement command such that existing user setting information is deleted, and new user setting information may be then added at a designated position. Also, the server 300 may process the movement command such that existing user setting information is updated with new user setting information, and updated user setting information is moved to a corresponding position. Also, the movement command may be processed such that new user setting information is added at a designated position while existing user setting information is deleted.

Where movement of user setting information requested to be moved is successfully completed, the server 300 transmits a response message to the client 200 (operation 711). That is, where movement of user setting information succeeds, the server 300 generates a success response message, such as a 200 OK message, and transmits the success response message to the client 200.

Where operation 703 determines that the user setting information does not exist, the server 300 transmits a response message reporting that the user setting information requested to be moved does not exist to the client 200 (operation 713). That is, where searching to find the user setting information fails, the server 300 generates an error response message, such as a 404 Not Found message, and transmits the error response message to the client 200.

The server 300 may further perform the following procedure in response to a particular message received from the client 200 which is transmitted in response to the error response message. For example, the server 300 may perform procedures to delete corresponding user setting information in response to the user setting information deletion request message and to add new user setting information at a designated position in response to the user setting information addition request message.

Furthermore, according to an exemplary embodiment, an XML document (user setting information) stored in the server 300 may be controlled by a plurality of clients. Accordingly, each client needs to be notified that an XML document in the server 300 is changed by a different client. Therefore, in an exemplary embodiment, whenever a particular XML document is changed, each client may be notified of a changed portion.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

According to example(s) described above, there is provided a method and system employing XCAP which improves performance and stability of XCAP technology applied to individualized services. The examples also relates to a method and system employing XCAP in which XCAP is extended to efficiently manage user setting information registered in a server. The examples also relates to a method and system in which a new method for XCAP is defined, movement of user setting information is controlled using the newly defined method, and movement of user setting information registered in a server is efficiently managed. The examples also relates to a method and system for moving user setting information in XCAP using two-pass signaling instead of four pass-signaling, thereby reducing network traffic and guaranteeing data stability.

As apparent from the above description, a system and method of controlling movement of user setting information registered in a server may improve performance and stability of XCAP used with individualized services.

Also, a technical limitation of the conventional XCAP technique which cannot efficiently handle movement of user setting information may be overcome. Therefore, network traffic and processing time are reduced where handling or controlling movement of user setting information in XCAP. In addition, stability may be ensured where moving user setting information.

Further, as the movement function which is compatible with the existing XCAP is newly defined, movement of user setting information may be processed in a single operation (transaction). Therefore, network traffic may be reduced where movement of user setting information is controlled, thereby increasing data stability.

Furthermore, commercialization and the industrial application of the above exemplary embodiments may be maximized since compatibility with existing standards may be maintained.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling the movement of user setting information that is registered in a server, the method comprising:
    transmitting, from a client to the server, a movement request message comprising a single uniform resource identifier (URI) that is defined to move a particular user setting information from a first position on a list to a second position on the list; and
    processing, at the server, the movement of the particular user setting information as commanded by the movement request message, and transmitting a response message to the client, the processing comprising:
        checking whether the particular user setting information indicated by the movement request message exists;
        checking the movement request message to determine whether new user setting information exists;
        moving the particular user setting information to the second position in response to the particular user setting information existing and the new user setting information not existing; and
        updating the particular user setting information based on the new user setting information at the second position, in response to the new user setting information existing.

2. The method of claim 1, wherein the movement request message comprises a method of commanding movement of the particular user setting information, and a position and an attribute of the particular user setting information.

3. The method of claim 1, wherein the single URI that is defined to move the particular user setting information from the first position on the list to the second position on the list is a Hypertext Transfer Protocol (HTTP) POST method that is used in an Extensible Markup Language (XML) Configuration Access Protocol (XCAP).

4. The method of claim 1, wherein the processing of the movement of the particular user setting information further comprises:
    generating an error response message when the particular user setting information does not exist.

5. The method of claim 1, wherein the updating of the particular user setting information is performed using at least one of a method of adding the new user setting information at the second position after deleting existing user setting information, a method of updating existing user setting information with the new user setting information and moving the updated user setting information to a corresponding position, and a method of adding the new user setting information at the second position while deleting the existing user setting information.

6. The method of claim 1, wherein the single URI comprises the particular item to be moved and a position at which the particular item is to be moved to.

7. A method of controlling the movement of user setting information that is registered in a server, the method comprising:
    transmitting, to the server, a movement request message comprising a single uniform resource identifier (URI) that is defined to move a particular user setting information from a first position on a list to a second position on the list;
    receiving a response message to the movement request message from the server and analyzing the response message,
    wherein when new user setting information is included in the movement request message, the particular user setting information is updated at the second position on the list based on the new user setting information, and when new user setting information is not included in the movement request message, the particular user setting information is moved to the second position on the list.

8. The method of claim 7, wherein the movement request message comprises a method of commanding movement of the particular user setting information, and a position and an attribute of the particular user setting information.

9. The method of claim 7, wherein the single URI that is defined to move the particular user setting information from the first position on the list to the second position on the list is a Hypertext Transfer Protocol (HTTP) POST method that is used in an Extensible Markup Language (XML) Configuration Access Protocol (XCAP) to move the particular user setting information.

10. A method of controlling the movement of user setting information that is registered in a server, the method comprising:
    receiving, from a client, a movement request message comprising a single uniform resource identifier (URI) that is defined to move a particular user setting information from a first position on a list to a second position on the list;
    searching for user setting information indicated by the movement request message; and
    in response to finding the user setting information, processing the movement of the user setting information by moving the user setting information from the first position on the list to the second position on the list, the processing comprising:
        checking whether new user setting information is included in the movement request message;
        updating the particular user setting information at the second position based on the new user setting information in response to the new user setting information existing; and
        moving existing particular user setting information to the second position in response to new user setting information not existing.

11. The method of claim 10, wherein the updating of the particular user setting information is performed using at least one of a method of adding the new user setting information at a designated position after deleting existing user setting information, a method of updating existing user setting information with the new user setting information and moving the updated user setting information to a corresponding position, and a method of adding the new user setting information at a designated position while deleting the existing user setting information.

12. A system to control the movement of user setting information, the system comprising:
- a client to generate and transmit a movement request message comprising a single uniform resource identifier (URI) that is defined to move a particular user setting information from a first position on a list to a second position on the list, and a position and an attribute of the particular user setting information; and
- a server to process movement of the particular user setting information in response to receiving the movement request message of the client, and to generate and transmit a response message including movement processing result information,
- wherein the server checks whether the particular user setting information indicated by the movement request message exists, checks the movement request message to determine whether new user setting information exists, moves the particular user setting information to the second position in response to the particular user setting information existing and the new user setting information not existing, and updates the particular user setting information based on the new user setting information at the second position, in response to the new user setting information existing.

13. The system of claim 12, wherein the single URI that is defined to move the particular user setting information from the first position on the list to the second position on the list is a Hypertext Transfer Protocol (HTTP) POST method that is used in an Extensible Markup Language (XML) Configuration Access Protocol (XCAP).

14. The system of claim 12, wherein the server checks a body of the movement request message when the particular user setting information exists, and updates the user setting information with new user setting information at a designated position when the new user setting information exists in the body.

15. The system of claim 14, wherein the server performs the update using at least one of a method of adding the new user setting information at a designated position after deleting existing user setting information, a method of updating existing user setting information with the new user setting information and moving the updated user setting information to a corresponding position, and a method of adding the new user setting information at a designated position while deleting the existing user setting information.

16. The system of claim 12, wherein the server comprises:
- a resource search module to search for the particular user setting information indicated by the movement request message;
- a body search module to search for new user setting information in a body of the movement request message; and
- a resource processor to process control of user setting information according to a command commanded by a request message of the client, and process movement of the particular user setting information at a designated position commanded by the movement request message as the request message.

* * * * *